(12) United States Patent
Aitken et al.

(10) Patent No.: US 6,656,859 B2
(45) Date of Patent: *Dec. 2, 2003

(54) TELLURITE GLASSES AND OPTICAL COMPONENTS

(75) Inventors: Bruce G. Aitken, Corning, NY (US); Adam J. G. Ellison, Corning, NY (US); Randall E. Youngman, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/016,337

(22) Filed: Dec. 6, 2001

(65) Prior Publication Data

US 2002/0082156 A1 Jun. 27, 2002

Related U.S. Application Data

(63) Continuation of application No. 09/417,260, filed on Oct. 12, 1999, now abandoned.

(51) Int. Cl.[7] ............................. C03C 3/12; H04B 13/00
(52) U.S. Cl. ............................. 501/41; 501/37; 501/38; 501/43; 501/44; 501/45; 501/46; 501/47; 501/48; 501/49; 501/50; 501/51; 501/52; 359/341.5; 359/343; 372/6; 372/40; 252/301.5; 252/301.6 P; 252/301.4 P; 252/301.44
(58) Field of Search ..................... 501/37, 38, 41, 501/43–52; 359/341, 343; 372/6, 40; 252/301.5, 301.6 P, 301.4 P, 301.44

(56) References Cited

U.S. PATENT DOCUMENTS

| | | |
|---|---|---|
| 2,763,559 A | 9/1956 | Weissenberg et al. |
| 3,690,908 A | 9/1972 | Greco et al. |
| 3,883,357 A | 5/1975 | Cooley |
| 4,652,536 A | 3/1987 | Nakajima et al. |

(List continued on next page.)

FOREIGN PATENT DOCUMENTS

| | | |
|---|---|---|
| EP | 0 858 976 A2 | 8/1998 |
| FR | 2479180 | 10/1981 |
| JP | 62-288135 | 12/1987 |
| JP | 07-330372 | 12/1995 |
| JP | 08-110535 | 4/1996 |
| JP | 11125725 A * | 5/1999 |
| JP | 11-125725 | 5/1999 |
| WO | WO 00/78687 | 12/2000 |
| WO | WO 01/01529 | 1/2001 |

OTHER PUBLICATIONS

Imaoka et al., "Glass–Formation Ranges of Ternary Systems (Part 5) Tellurites Containing b–Group Elements" *Report of the Institute of Industrial Science*, The University of Tokyo, 26(1):1–46 (1976).

Mazurin et al., *Handbook of Glass Data. Part B. Single Component and Binary Non–Silicate Oxide Glasses*, Amsterdam: Elsevier, pp. 672–710 (1985).

(List continued on next page.)

*Primary Examiner*—David Sample
(74) *Attorney, Agent, or Firm*—Mary Y. Redman (57) ABSTRACT

A family of tellurite glasses and optical components for telecommunication systems, the glasses consisting essentially of, as calculated in cation percent, 65–97% $TeO_2$, and at least one additional oxide of an element having a valence greater than two and selected from the group consisting of Ta, Nb, W, Ti, La, Zr, Hf, Y, Gd, Lu, Sc, Al and Ga, that may contain a lanthanide oxide as a dopant, in particular erbium oxide, and that, when so doped, is characterized by a fluorescent emission spectrum having a relatively broad FWHM value.

54 Claims, 3 Drawing Sheets

U.S. PATENT DOCUMENTS

| | | | |
|---|---|---|---|
| 4,732,875 | A | 3/1988 | Sagara |
| 5,251,062 | A | 10/1993 | Snitzer et al. |
| 6,194,334 | B1 | 2/2001 | Aitken et al. |
| 6,266,181 | B1 | 7/2001 | Ohishi et al. |
| 6,352,950 | B1 * | 3/2002 | Aitken et al. ........ 252/301.4 H |

OTHER PUBLICATIONS

Mazurin et al., *Handbook of Glass Data. Part D. Ternary Non–Silicate Glasses*, Amsterdam: Elsevier, pp. 816–894 (1991).

Mori et al., "1.5 uB Broadband Amplification by Tellurite–Based EDFA's," NTT Opto–Electronics Labs, NTT Corp., PD1–1 to PD1–4, 1997.

Al–Ani et al., "Correlation of Refractive Index and Density in High Refractive Index Glasses," *Journal of Materials Science Letters*, 6:519–521 (1987).

Malashkevich et al., "Kinetics of Luminescence of Europium–Activated Tellurite–Tungstate Glasses," *Soviet Journal of Glass Physics and Chemistry*, 18:49–52 (1992).

Sekiya et al., Raman Spectra of MO1/2–TeO2 (M=Li, Na, K, Rb, Cs, and Tl) Glasses, *Journal of Non–Crystalline Solids*, 144:128–144 (1992).

Wallenberger et al., "Infrared Optical Tellurite Glass Fibers," *Journal of Non–Crystalline Solids*, 144:107–110 (1992).

Sekiya et al., "Structural Study of WO3–TeO2 Glasses," *Journal of Non–Crystalline Solids*, 176:105–115 (1994).

Cuevas et al., "Preparation and Characterization of Tellurium Oxide Based Glass: Li2O–TiO2–TeO2 System, "*Journal of Non–Crystalline Solids*, 191:107–114 (1995).

Endo Tadashi et al., "Upconversion Fluorescence of Tellurium Glasses Doped With Rare Earths," *Journal of the Japan Society of Powder and Powder Metallurgy*, 42(1):61–66 (1995).

Kosuge et al., "Thermal Stability and Heat Capacity Changes at the Glass Transition in K2O–WO3–TeO2 Glasses," *Journal of Non–Crystalline Solids*, 242:154–164 (1998).

* cited by examiner

TELLURITE GLASSES AND OPTICAL COMPONENTS

The present application is a continuation of U.S. patent application Ser. No. 09/417,260, filed Oct. 12, 1999, now abandoned.

FIELD OF THE INVENTION

Tellurite glasses having compositions that provide increased bandwidth of the emission spectra of rare earth dopants in the glasses and enhanced thermal stability of the glasses, and optical components that are composed of these glasses and that are used in telecommunication systems.

BACKGROUND OF THE INVENTION

Optical components, in particular components employing optical fibers doped with rare earth metal ions, are widely used in telecommunication systems. A major application is in signal amplifiers which employ fluorescent ion emission for amplification of a signal. The ion emission occurs within the same operating wavelength region as the signals. Pump energy excites the rare earth metal ion causing it to fluoresce and thereby provide optical gain.

Glasses, doped with a rare earth metal ion and pumped with appropriate energy, exhibit a characteristic, fluorescence intensity peak. The evolution of telecommunication systems has created a need for a rare-earth-doped, amplifier material having the broadest possible emission spectrum in the wavelength region of interest. It is a purpose of the present invention to meet this need.

The bandwidth of a fluorescent intensity curve is, rather arbitrarily, taken as the full width half maximum (FWHM) of the curve in nanometers wavelength. This value is the lateral width of the curve at one half the maximum intensity, that is, at one half the vertical height of the peak of the curve. Unfortunately, many glasses, that exhibit a fluorescence in an appropriate region, exhibit a rather narrow bandwidth. It is a further purpose of the invention to provide a family of glasses that exhibit a relatively broad bandwidth.

It is well known that glasses doped with erbium can be caused to emit fluorescence in the 1520–1560 nm. region. This enables a signal operating in this wavelength range to be amplified. The significance of the 1550 nm. wavelength region in optical communication has led to extensive studies regarding the behavior of erbium as a rare earth metal dopant in glasses. It has also led to the study of a variety of glasses as the host for the erbium ion.

The low phonon energy of tellurite glasses can lead to long emission lifetimes for certain pump wavelengths. As an example, erbium in tellurite glasses exhibits long tau-32 (980 nm. emission) values relative to silicates. The long emission lifetimes at this practical pump wavelength can reduce the efficiency of an amplifier or laser because of insufficient population at the upper laser level and excited state absorption. A practical 980 nm. pumping scheme can be obtained by co-doping glasses with low mass components having phonon overtones that are resonant with the energy difference between the 980 and 1530 nm. levels. Such components include $H_2O$, $B_2O_3$, $P_2O_5$.

For certain applications, a long, erbium, tau-32 emission value, that is, a long erbium, emission lifetime at 980 nm, is desirable. These include long-band amplifiers, where pumping directly into the ground-state absorption does not impact noise figure; also tilt-free amplifiers, in which 980 nm. and 1480 nm. pump lasers are combined. The latter dynamically adjusts the gain without affecting the shape of the gain spectrum.

It is also known that glasses with moderately low maximum phonon energies, when doped with thulium, can display fluorescence in the vicinity of 1450 nm. Although this wavelength lies outside of the currently used telecommunications band, it still lies within the transparency window of most commercial optical fiber. The ever-increasing demand for useful bandwidth will create a need for additional amplifier devices that operate over the remaining portions of this window that are not covered by erbium.

It is known that, as the concentration of a rare earth metal ion, such as erbium, is increased, the optical gain increases up to a certain point. Beyond this point, the fluorescent signal is quenched, and the optical gain decreases. This phenomenon is considered to result from the dopant, rare earth metal ions interacting with each other in a manner commonly referred to as clustering. It is another purpose of the invention to provide a family of glasses which is readily capable of dissolving erbium ions, and which exhibits a broad bandwidth indicating that clustering is inhibited.

It has been reported that certain tellurite glasses, doped with erbium ions, provide a very broad, erbium emission band in the 1540 nm. region of the spectrum. Glass compositions were not there reported, but other sources indicate that the glasses are alkali-alkaline earth-zinc-tellurite glasses.

Tellurite glasses—oxide glasses based on $TeO_2$—are unusual in that the basic, network-forming, Te—O polyhedra can vary from trigonal $TeO_3$ pyramids to distorted $TeO_4$ groups. The latter can be regarded as trigonal bipyramids lacking an equatorial oxygen. Raman spectroscopy has shown that $TeO_4$ groups dominate the structure of these glasses at high $TeO_2$ content, but are progressively replaced by $TeO_3$ groups with rising concentration of other oxides.

The diversity of $TeO_x$ species was thought to yield a greater diversity of structural sites for the incorporation of dopant ions, such as erbium ions. This would avoid the ions clustering and becoming ineffective for fluorescent emission and consequent amplification. This diversity of dopant sites should give rise to broadened, emission spectra. It is, then, a basic purpose of the present invention to provide a family of tellurite glasses in which compounds of rare earth metals, such as erbium, are readily soluble due to a diversity of compositional sites with which they can associate.

Both $TeO_x$ species are highly asymmetric due to the stereochemical effect of the lone 5s electron pair on the central $Te^{4+}$ ion. On account of the latter, as well as the high atomic number of Te, these glasses are perhaps best known for their high refractive index that ranges from about 1.9 to 2.2. Another consequence of the stereochemically active, lone electron pair on $Te^{4+}$ is the high optical nonlinearity of these materials, reportedly on the order of $10^{-13}$ esu at 1060 nm. This is roughly forty times that of fused silica.

SUMMARY OF THE INVENTION

The invention resides, in part, in a family of tellurite glasses having compositions that consist essentially of, as calculated in cation percent, 65–97% $TeO_2$, and at least one additional oxide of an element selected from the group consisting of Ta, Nb, W, Ti, La, Zr, Hf, Y, Gd, Lu, Sc, Al, Ga and mixtures.

The invention further resides in an optical component for a telecommunication system that is composed, in part at least, of a tellurite glass that has a high thermal stability $(T_x - T_g)$, that readily dissolves rare earth metal oxides and that has a composition consisting essentially of, as calculated in cation percent, 65–97% $TeO_2$, at least one additional oxide of an element having a valence greater than two, the element being selected from the group consisting of Ta, Nb, W, Ti, La, Zr, Hf, Y, Gd, Lu, Sc, Al and Ga and mixtures, and 0.005–10% of a lanthanide (Ln) oxide.

BRIEF DESCRIPTION OF THE DRAWINGS

In the accompanying drawings.

DESCRIPTION OF THE INVENTION

As indicated earlier, there is an increasing demand in the telecommunications field for glasses having a broad, flat bandwidth in the 1.5 μm wavelength window. Such glasses find general application, but, currently, are in particular demand as drawn fibers for use in amplifier devices. The present invention is based on the discovery that tellurite glasses, doped with erbium and containing at least one selected, additional oxide in their compositions, meet the need.

The present, base glass compositions are composed primarily of $TeO_2$ in an amount of 65–97% cation percent. The required additional oxide will be an oxide of a high-valent metal, that is, a metal with a valence of three (3) or greater. This will be 3–35 cation % of one or more oxides of elements in the group consisting of Ta, Nb, W, Ti, La, Zr, Hf, Y, Gd, Lu, Sc, Al and Ga.

With the exception of Zr, Hf and Y, these additional oxides may form a binary glass with $TeO_2$. To form a binary tellurite glass with Al or Ga oxide, at least about 5 cation % of the Al or Ga oxide is required. Furthermore, in a ternary glass containing Al and/or Ga, no more than 15% of Zr or Hf oxide can be employed, while the oxides of Y, Gd, Lu and Sc and limited to 20%. While binary glasses may be melted as indicated, optimum properties are obtained with a base glass containing a mixture of additional oxides. In particular, a mixture of Ta and/or Nb oxides with Al and/or Ga oxides is preferred. For telecommunication purposes, the compositions will further contain 0.005–10% of a lanthanide oxide, in particular, erbium oxide or thulium oxide.

Erbium-doped tellurite glasses containing one or more of the oxide group consisting of Ta, Nb, W, Ti, La, Zr, Hf, Y, Gd, Lu, Sc oxides have been found to exhibit relatively broad emission characteristics. These glasses also possess good optical transparency and good thermal stability. The latter, as measured by $T_x$-$T_g$ values, facilitates fiber fabrication.

Alumina or gallia may be melted with tellurium oxide to form a binary glass. The use of alumina is limited by its tendency to produce a "hard" glass, that is, a glass with high melting and working temperatures. Gallium tellurite glass batches are easier to melt than corresponding, aluminum-tellurite batches. However, the resulting glass has a slightly narrower emission band for Er at 1.5 μm than does a corresponding aluminum tellurite glass. Consequently, these oxides are primarily employed in conjunction with one of the first named oxide group. When so used, they tend to further broaden the erbium emission spectrum.

Figure 1:
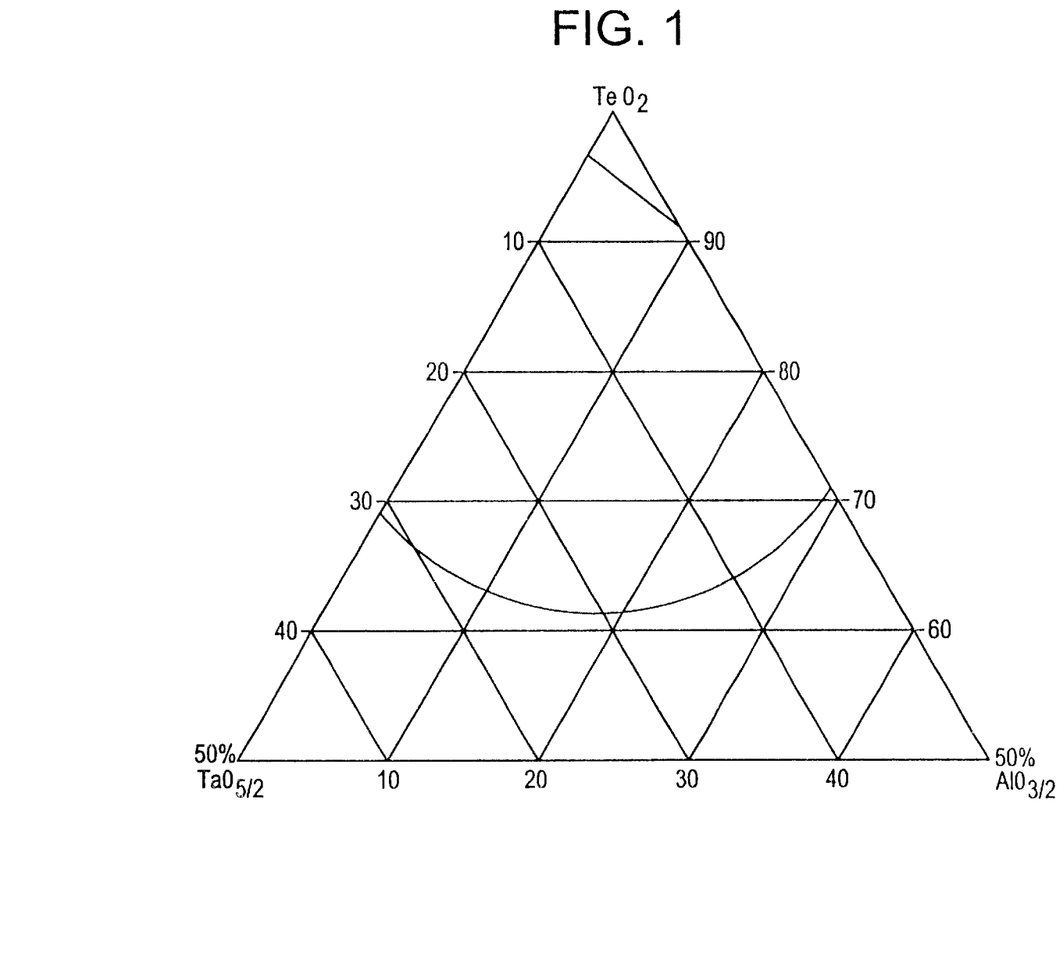
FIG. 1 is a ternary diagram showing the area within which tellurite glass batches containing tantala and/or alumina can be melted and formed into glass articles at practical cooling rates.

FIG. 1 is a partial ternary diagram showing the composition area in which the present glasses can be melted employing normal procedures. The apex of the diagram represents 100 cation % $TeO_2$. The horizontal base line is a 50 cation % $TeO_2$ content line. The left hand end of the line represents 50 cation % of the oxide of Ta expressed as $TaO_{5/2}$. The right hand end of the line represents 50 cation % of the oxide of Al expressed as $AlO_{3/2}$. The lower portion of the diagram is omitted to facilitate showing the composition area, since no composition with less than 50% $TeO_2$ produces a glass.

As indicated earlier, while binary compositions can be melted, optimum properties are obtained with glasses, the compositions of which contain Al and/or Ga oxides in conjunction with at least one oxide of the group consisting of Ta, Nb, W, La, Zr, Hf, Y, Gd, Lu, Sc oxides. A base composition, containing $TeO_2$ together with Ta oxide and Al and/or Ga oxides, is preferred.

The base glass compositions may be modified to alter the physical properties of glasses having these compositions. In particular, they may be modified for the purpose of providing combinations of core and cladding glasses for an optical fiber. For that purpose, the glasses must exhibit a difference in refractive indices, as is well known. Otherwise, however, it is desirable that the core and cladding glasses have properties as near identical as possible.

The optional, modifying oxides may include 0–20% MO where M is Mg, Ca, Sr, Ba, Zn, Cd and/or Pb, 0–25% $RO_{1/2}$ where R is Li, Na, K, Rb, Cs and/or Tl, 0–20% $SbO_{3/2}$ and/or $BiO_{3/2}$. The various oxide constituents in the present compositions may be replaced by the corresponding metal halides to the extent that the ratio of total halide to total halide plus oxygen content does not exceed about 1:5 on an atomic basis.

TABLE I sets forth, as calculated in cation percent on an oxide basis, the compositions of a series of tellurite glasses containing oxides of niobium and/or tantalum and/or tungsten as components, and also doped with erbium. TABLE I also provides thermal expansion coefficient data in ppm/° C. and thermal stability index ($T_x$-$T_g$) values in ° C. for glasses having these compositions. For comparison purposes, a prior glass, having a composition composed of alkali metal and tellurium oxides and doped with erbium, is included as Example 7.

TABLE I

|  | 1 | 2 | 3 | 4 | 5 | 6 | 7 |
|---|---|---|---|---|---|---|---|
| $TaO_{5/2}$ | 15 | 7.5 | — | 20 | 25 | 15 | — |
| $NbO_{5/2}$ | — | 7.5 | 15 | — | — | — | — |
| $WO_3$ | — | — | — | — | — | 5 | — |
| $TeO_2$ | 85 | 85 | 85 | 80 | 75 | 80 | 76 |
| $NaO_{1/2}$ | — | — | — | — | — | — | 12 |
| $KO_{1/2}$ | — | — | — | — | — | — | 12 |
| $Er_2O_3$ (ppm) | 1000 | 1000 | 1000 | 1000 | 1000 | 1000 | 500 |
| Tx – Tg (° C.) | 138 | 125 | 122 | 153 | 141 |  | 108 |
| CTE ppm/° C. |  | 13.97 | 14.72 | 12.33 |  |  |  |

TABLE II sets forth in tabular form a series of tantala-tellurite glasses additionally containing aluminum and/or gallium oxide and being doped with 1000 ppm by weight of erbium oxide. These glasses illustrate a preferred form of the invention. Also set forth for each glass is its $T_x$-$T_g$ and FWHM values.

TABLE II

| Glass | % TaO$_{2.5}$ | % AlO$_{1.5}$ | % GaO$_{1.5}$ | % TeO$_2$ | T$_x$ - T$_g$ (° C.) | FWHM (nm) |
|---|---|---|---|---|---|---|
| 8 | 10 | 10 | — | 80 | 136 | 51 |
| 9 | 5 | 15 | — | 80 | 124 | 57 |
| 10 | 15 | 10 | — | 75 | 145 | 52 |
| 11 | 10 | 15 | — | 75 | 146 | 52 |
| 12 | 5 | 20 | — | 75 | 134 | 57 |
| 13 | 15 | 15 | — | 70 | ~136 | 56 |
| 14 | 13.75 | 13.75 | — | 72.5 | ~148 | 50 |
| 15 | 12.5 | 12.5 | — | 75 | 157 | 51 |
| 16 | 11.25 | 11.25 | — | 77.5 | 150 | 53 |
| 17 | 5 | — | 15 | 80 | 118 | 51 |
| 18 | 10 | — | 10 | 80 | 131 | 51 |
| 19 | 15 | — | 5 | 80 | 118 | 51 |

T$_g$ of these glasses ranges from 330 to 420° C. T$_g$ increases with (1) decreasing TeO$_2$ content, or (2) rising Ta/Al at constant TeO$_2$. The variation in T$_x$ is such that the most stable glasses (in the sense of maximizing the quantity T$_x$-T$_g$) have TeO$_2$ concentrations of 75–80%. This locates the most stable compositions in the center of the glass-forming region. The thermal expansion coefficient (α) is high, on the order of 13 ppm/° C., and, for binary Ta tellurite glasses, α decreases with rising Ta content. For the latter glasses, density (ρ) is almost 6 gm/cc, and rises with increasing Ta concentration. The effect of replacing Ta with Nb in binary R$_2$O$_5$—TeO$_2$ glasses results in a decrease in T$_g$ and ρ, and an increase in α.

Er-doped TaAl and TaGa tellurite glass samples were prepared by mixing appropriate 20–25 gm batches of Ta$_2$O$_5$, Al$_2$O$_3$, Ga$_2$O$_3$, TeO$_2$ and Er$_2$O$_3$. The batches were melted in an electric furnace in 50 cc Vycor® or Au crucibles for 15–20 minutes at 850–1050° C. The melts were quenched on a steel plate and annealed near the glass transition temperature (T$_g$).

T$_g$ and T$_x$ were determined by DSC at a heating rate of 10° C./min. with a precision of ±2° C. Thermal expansion was measured from room temperature to 300° C. with a precision of ±0.1 ppm/° C. by dilatometry using Al$_2$O$_3$ as a reference. Density was measured to ±0.005 gm/cc in water at room temperature by the Archimedes method. Fluorescence spectra were taken with a Spex spectrofluorimeter using a Xe lamp as the excitation source.

These glasses may be used in bulk form for planar devices. However, an area of greater, current interest is glass in the form of optical fibers. For fiber production, the thermal stability of a glass is an important consideration. Accordingly, a large value for the thermal stability index (T$_x$-T$_g$) is significant.

The thermal stability index is the temperature interval between a temperature (T$_x$) and the glass transition temperature (T$_g$). As used here, T$_x$ represents the temperature at the onset of crystal formation. Any development of crystals in the glass can be detrimental.

For drawing of fibers, the thermal stability index value of a glass should be as high as is compatible with other properties. A value of at least 100° C. is deemed necessary, while a value in excess of 125° C. is preferred. Such an index value, in view of the steepness of the viscosity curve for these glasses, is sufficient to permit fiberization of the glasses in a practical manner, for example, by redrawing "rod-in-tube" preforms.

As TABLE II indicates, tellurite base glasses containing an oxide of tantalum in conjunction with an oxide of aluminum or gallium generally provide thermal stability index values in excess of 125° C. The TeO$_2$ content is preferably in the range of 70–85% with optimum values being obtained with TeO$_2$ contents of 75–80%.

By way of illustrating fiber production with the present glasses, a continuous fiber, having a 180 μm diameter, was redrawn from a cylindrical preform of TaGa tellurite glass. The glass was doped with erbium and had a T$_x$-T$_g$ value of 129° C. This fiber exhibited an attenuation of less than one dB/m at 1.34 μm.

Figure 2:
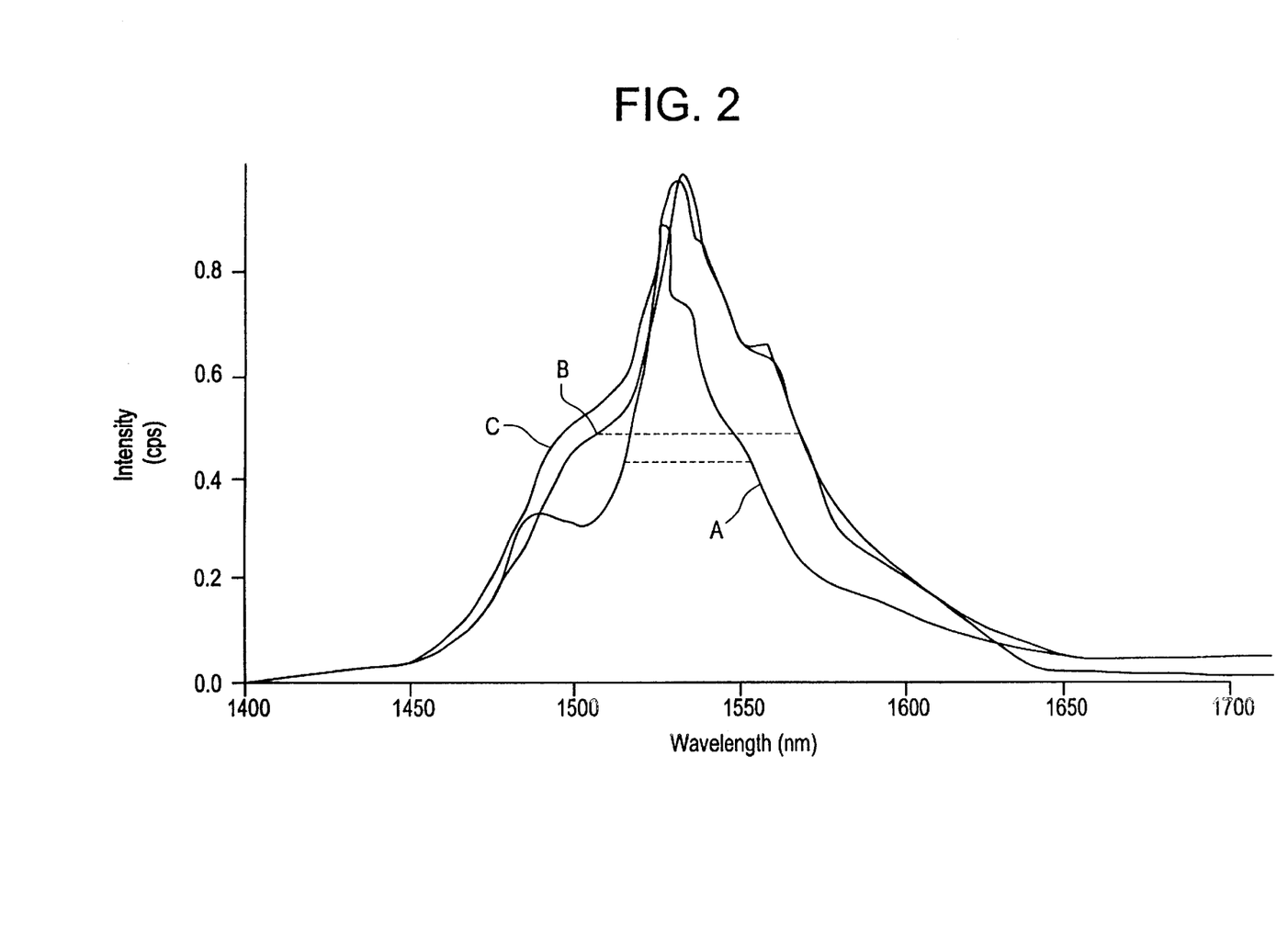
FIG. 2 is a graphical representation comparing the emission spectrum of a glass of the present invention with that of a known tellurite glass.

A particular feature of the present glasses is the enhanced bandwidth of their emission spectrum when doped with erbium and pumped with 980 nm energy. This property is illustrated in FIG. 2 which compares the emission spectrum of a typical tantala-alumina-tellurite glass with a prior art tellurite glass. Relative emission intensity is plotted on the vertical axis in arbitrary units (a.u.) for comparison purposes. Wavelength in nanometers, is plotted on the horizontal axis.

Curve A represents the emission spectrum for a known alkali metal tellurite glass that contains none of the present additional oxides in its composition. This glass has the composition of Example 7 in TABLE I. Curve B represents the emission spectrum for a typical, tellurite glass of the present invention (Example 12 of TABLE II). The dashed, lateral lines indicate the FWHM value for each glass. The flatter and broader character of Curve B, and the consequent, greater FWHM value of the glass, are apparent. This is a typical and significant feature of the present glasses.

TABLE III shows the compositions of several tellurite glasses that contain additional oxides, other than the oxides aluminum and tantalum, with or without gallium oxide. Also shown is the FWHM value for each glass.

Compositions 20–25 contain oxides in which the metallic element has a valence greater than two (WO$_3$, LaO$_{3/2}$ and ZrO$_2$). As indicated, these oxides illustrate the effectiveness of such oxides, particularly in conjunction with gallium oxide, in providing enhanced FWHM values. Compositions 26–31 illustrate the effect of oxides in which the metallic element has a valence less than three on the FWHM values.

Examples 26 and 27 in TABLE III illustrate the effect of Ba on depressing the FWHM value of a glass even with Ga present. This effect prevails when the ratio of BaO to GaO$_{3/2}$ is greater than 1.5:1. However, when the same ratio is less, as in example 28, the effect, if any, is minimal. Examples 29–31 demonstrate the same effect prevails with Na$_2$O. This depressing effect occurs generally with any divalent or monovalent oxide present, with respect to either AlO$_{3/2}$ or GaO$_{3/2}$, in a ratio over about 1.5:1.

The oxides of the low valence elements (valence less than three) do have value as modifying oxides to adjust physical properties, such as refractive index. However, to avoid nullifying the effect of an oxide of a higher valence element on the FWHM value, the ratio of the oxide of the higher valence element (e.g. Al or Ga) to that of the oxide of the lower valence element (e.g. Na or Ba) must be maintained greater than 1:1.5.

TABLE III

| Ex. | TeO$_2$ | GaO$_{3/2}$ | WO$_3$ | LaO$_{3/2}$ | ZrO$_2$ | BaO | NaO$_{1/2}$ | FWHM |
|---|---|---|---|---|---|---|---|---|
| 20 | 80 | — | 20 | | | | | 50 |
| 21 | 80 | 5 | 15 | | | | | 56 |
| 22 | 80 | 15 | 5 | | | | | 54 |
| 23 | 80 | 5 | — | 15 | | | | 51 |
| 24 | 80 | 15 | — | 5 | | | | 54 |

TABLE III-continued

| Ex. | TeO$_2$ | GaO$_{3/2}$ | WO$_3$ | LaO$_{3/2}$ | ZrO$_2$ | BaO | NaO$_{1/2}$ | FWHM |
|---|---|---|---|---|---|---|---|---|
| 25 | 80 | 15 | — | — | 5 | | | 51 |
| 26 | 80 | — | | | | 20 | | 39 |
| 27 | 80 | 5 | | | | 15 | | 42 |
| 28 | 80 | 15 | | | 5 | | | 50 |
| 29 | 80 | — | | | | | 20 | 38 |
| 30 | 80 | 5 | | | | | 15 | 42 |
| 31 | 80 | 15 | | | | | 5 | 52 |

In an effort to ascertain a reason for the enhanced bandwidth breadths (FWHM values) of the present glasses, a solid state NMR spectroscopic study was carried out. Both aluminum-containing and gallium-containing glasses were examined. It is known that rare earth metals, as dopants, are intimately associated structurally with aluminum in other glasses. This prompted the study to determine the situation in the present glasses.

The NMR studies showed the existence of three prominent peaks in both the aluminum-containing and the gallium-containing glasses. These peaks indicated 6-fold, 5-fold and 4-fold coordination of each element with repect to oxygen.

At a fixed TeO$_2$ content, the relative proportions of the three Al species, shown by the peaks, remain relatively constant. However, the proportions are strongly dependent on TeO$_2$ concentration. Thus, with low TeO$_2$ contents, tetrahedral Al dominates the spectrum, while octahedral Al is the principal species in glasses with the highest TeO$_2$ content. In any event, each of the three coordinations, for either Al or Ga, was shown to be present to the extent of at least 15%, and up to 55%, of the total elemental Al plus Ga content.

As mentioned previously, the diversity of TeO$_x$, species is thought to create a greater diversity of structural sites in these glasses for the incorporation of dopant ions, such as Er ions. In much the same way, the extraordinary diversity of the AlO$_x$ and GaO$_x$ species in these tellurite glasses, as indicated by the NMR results, is thought to at least contribute to the broadened emission bandwidths observed. As rare earth metal dopants are believed to be preferentially associated with either Al or Ga as next nearest neighbors, it is particularly likely that the structural diversity of the aluminum and/or gallium effects a corresponding structural diversity in the rare earth dopant. This structural diversity in turn leads to the broadened emission bandwidth observed.

Figure 3:
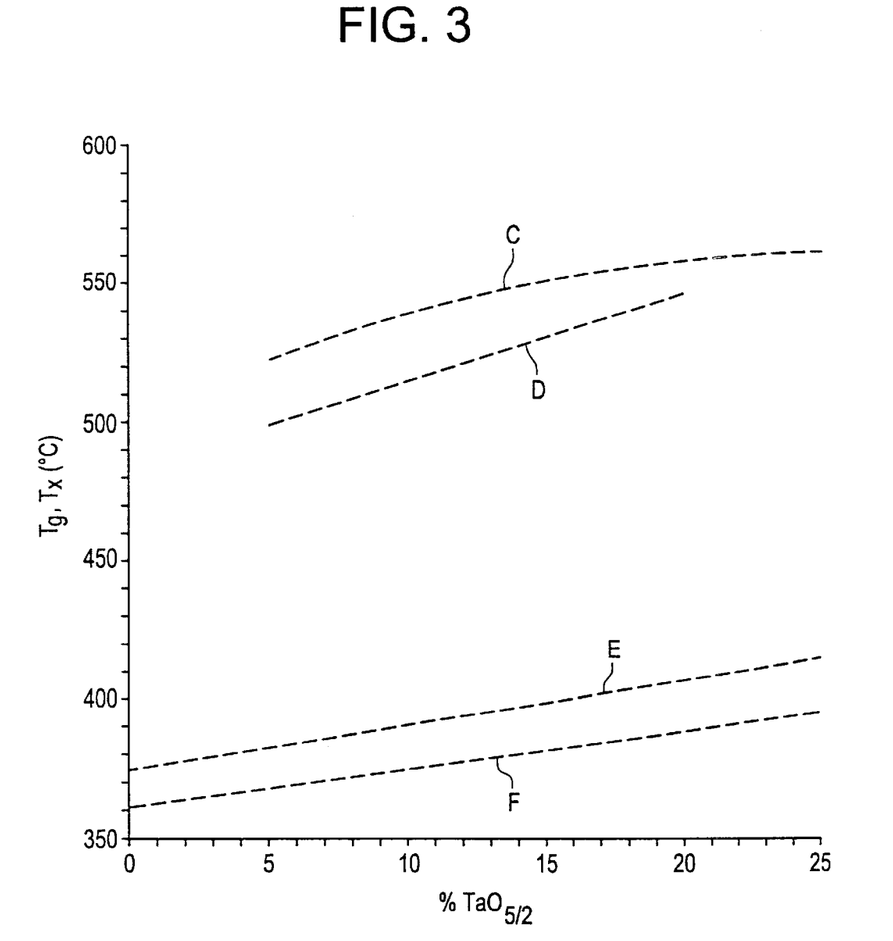
FIG. 3 is a graphical representation illustrating the thermal stability of a typical glass of the present invention.

FIG. 3, also a graphical representation, illustrates the thermal stability indices for tellurite glasses modified with tantala and alumina. T$_x$ and T$_g$ temperatures in ° C. are plotted on the vertical axis, and tantala (TaO$_{5/2}$) content, in cation %, is plotted on the horizontal axis.

Curves C and D in FIG. 3 represent T$_x$ temperatures for glasses having, respectively, 75 and 80 cation percent TeO$_2$. The remainder of the glass composition is tantala and alumina, the tantala content being plotted and alumina being the difference. Curves E and F represent the corresponding transition temperatures (T$_g$) for the same glasses over the same range of tantala content. The difference (T$_x$-T$_g$) at any selected tantala content is the thermal stability index for that glass.

The significant feature is the vertical distance between the curves at any given content of TeO$_2$. It will be observed that this vertical difference (T$_x$-T$_g$) is about 145° C. at about 75% TeO$_2$ and 10% Ta$_{5/2}$ content. As indicated earlier, this is extremely important in avoiding devitrification problems during the drawing of fibers by any preform, redraw technique.

The lightweight elements, hydrogen, boron and phosphorus, are desirable as oxide additives in the present glasses. This is because of their favorable influence on dopant ion lifetimes, particularly where erbium is the dopant ion. As a matter of practical economics in optical amplifier devices, it is customary to pump erbium with a laser that is operative at 980 nm. This poses a potential problem, since the laser pumps the ions to a level, commonly referred to as level 3, that is above the actual fluorescing level.

The effective fluorescent radiation for amplification of a signal at 1.5 $\mu$m emanates from an intermediate level known as level 2. The ground state, to which ions return after they fluoresce, is referred to as level 1. Most effective amplification at 1.5 $\mu$m is achieved by maximizing radiative output at intermediate level 2. To this end, it is desirable to control the ion lifetime of both levels 2 and 3.

Tau-32, that is, the lifetime of an ion at level 3 before decaying to level 2, should be as short as possible. This short lifetime avoids undesirable pump power losses due to upconversion. The presence of the oxides of lightweight elements shortens the lifetime, thereby facilitating the decay to level 2.

The effect of including a lightweight element in the present compositions is demonstrated in TABLE IV. That TABLE shows six (6) compositions in cation percent. The first five (5) are compositions of current glasses containing oxides of boron or phosphorus. The last composition is that of a comparison glass. Each composition additionally contains 1000 ppm by weight of Er$_2$O$_3$.

TABLE IV

| Glass | TaO$_{5/2}$ | GaO$_{3/2}$ | AlO$_{3/2}$ | BO$_{3/2}$ | PO$_{5/2}$ | TeO$_2$ | tau-32 | tau-21 |
|---|---|---|---|---|---|---|---|---|
| 32 | 10 | 10 | — | 1 | — | 79 | 67 | 3470 |
| 33 | 10 | 10 | — | 2.5 | — | 77.5 | 47 | 3440 |
| 34 | 10 | 10 | — | 5 | — | 75 | 28 | 3110 |
| 35 | 10 | 9.67 | 0.33 | — | 1 | 79 | 58 | 3250 |
| 36 | 10 | 9.17 | 0.83 | — | 2.5 | 77.5 | 42 | 3510 |
| 37 | 10 | 10 | — | — | — | 80 | 94 | 3650 |

The tau-32 and tau-21 times, in microseconds ($\mu$s), are shown for each glass. It will be observed that, while a relatively small decrease in the tau-21 time occurs, the tau-32 time may be cut to less than one-third that of the comparison time.

We claim:

1. A glass composition consisting essentially of, as calculated in cation percent on an oxide basis, 65–97% TeO$_2$, and at least two additional oxides in which at least one of said additional oxides is a first additional oxide of an element that has a valence greater than two and that is selected from the group consisting of Ta, Nb, W, Ti, La, Zr, Hf, Y, Gd, Lu, and Sc and in which another of said additional oxides is a second additional oxide selected from the group consisting of oxides of Al and Ga, said glass composition further comprising a fluorescing ion.

2. A glass composition in accordance with claim 1 in which said first additional oxide is an oxide of Ta, Nb, W, Ti or La in an amount up to 35%, an oxide of Zr or Hf in an amount up to 15%, or up to 20% of Y, Gd, Lu or Sc oxide.

3. A glass composition in accordance with claim 1 in which said second additional oxide is an oxide of Al or Ga in an amount up to 35%.

4. A glass composition in accordance with claim 1 further containing one or more modifying oxides selected from the oxides of Li, Na, K, Rb, Cs, Tl, Ca, Ba, Sr, Mg, Zn, Cd, Pb, Sb, Bi, H, B, and P.

5. A glass composition in accordance with claim 4 wherein the ratio of the content of the additional oxides of elements having a valence greater than two to the content of the modifying oxides in the glass composition is greater than 1:1.5.

6. A glass composition in accordance with claim 1 further containing between 0 and 20% of at least one modifying component having the formula RO where R is Mg, Ca, Sr, Ba, Zr, Cd, and/or Pb.

7. A glass composition in accordance with claim 1 that has a high thermal stability index ($T_x-T_g$) to avoid devitrification during glass forming, that readily dissolves rare earth metal oxides to provide fluorescing ions, and that contains 0.005–10% of an oxide of a fluorescing ion in the lanthanide series, as said fluorescing ion.

8. A glass composition in accordance with claim 7 wherein the oxide in the lanthanide series is erbium oxide or thulium oxide.

9. A glass composition in accordance with claim 7 further containing an element selected from B, H, P and mixtures thereof to shorten the fluorescing lifetime of level 3 for an erbium ion.

10. A glass composition in accordance with claim 1, wherein the Al and/or Ga is present in the glass in each of the 4, 5, and 6 coordinated forms, the amount of Al and/or Ga in each of the coordinated forms being at least about 15% of the total amount of such element(s) in the glass.

11. A glass composition in accordance with claim 1 wherein a portion of the metal oxides are replaced by metal halides, provided that the atomic ratio of the total halide content to the total halide content plus oxygen content of the glass is not over 1:5.

12. An optical component for a telecommunication system comprising a glass composition according to claim 1.

13. An optical component for a telecommunication system composed in part, at least, of a tellurite glass that has a high thermal stability ($T_x-T_g$), that readily dissolves rare earth metal oxides to provide fluorescing ions, and that has a composition consisting essentially of, as calculated in cation percent, 65–97% $TeO_2$, 0.005–10% of a fluorescing oxide of an element in the lanthanide series, and at least two additional oxides in which at least one of said additional oxides is a first additional oxide of an element that has a valence greater than two and that is selected from the group consisting of oxides of Ta, Nb, W, Ti, La, Zr, Hf, Y, Gd, Lu, and Sc and in which another of said additional oxides is a second additional oxide selected from the group consisting of oxides of Al and Ga.

14. An optical component in accordance claim 13 wherein the oxide in the lanthanide series is erbium or thulium.

15. An optical component in accordance with claim 13 wherein the glass has a thermal stability index ($T_x-T_g$) of at least 125° C.

16. An optical component in accordance with claim 13 wherein the glass composition further contains one or more modifying oxides selected from the oxides of Li, Na, K, Rb, Cs, Tl, Ca, Ba, Sr, Mg, Zn, Cd, Pb, Sb, Bi, H, B, and P.

17. An optical component in accordance with claim 13 the ratio of the content of the additional oxides of elements having a valence greater than two to the content of the modifying oxides in the glass composition is greater than 1:1.5.

18. An optical component in accordance with claim 13, wherein the oxide of an element in the lanthanide series comprises a fluorescing erbium ion and wherein the glass composition further contains at least one lightweight element selected from B, H, and P to shorten the tau-32 time of the erbium fluorescing ion.

19. An optical component in accordance with claim 13, wherein the Al and/or Ga is present in the glass in each of the 4, 5, and 6 coordinated forms, the amount of Al and/or Ga in each of the coordinated forms being at least about 15% of the total amount of such element(s) in the glass.

20. An optical component in accordance with claim 13, wherein a portion of the metal oxides are replaced by metal halides, the replacement being such that the atomic ratio of the total halide content to the total halide plus oxygen content is not over 1:5.

21. An optical component in accordance with claim 13, wherein the component is a clad optical fiber.

22. An optical amplifier comprising a clad optical fiber in accordance with claim 21.

23. A glass consisting of:
65–97% $TeO_2$;
at least one first additional oxide of an element that has a valence greater than two and that is selected from the group consisting of Ta, Nb, Ti, Zr, Hf, Y, Gd, Lu, and Sc;
optionally one or more second additional oxides selected from the oxides of Bi, W, La, Li, Na, K, Rb, Cs, Tl, Ca, Ba, Sr, Mg, Zn, Cd, Pb, Sb, H, B, P, Al, and Ga; and
at least one fluorescing ion.

24. A glass in accordance with claim 23, wherein said at least one first additional oxide is an oxide of Ta or Nb.

25. A glass in accordance with claim 23, wherein said one or more second additional oxides are selected from the oxides of W, La, Li, Na, K, Rb, Cs, Tl, Ca, Ba, Sr, Mg, Zn, Cd, Pb, Sb, H, B, P, Al, and Ga.

26. A glass in accordance with claim 23, wherein a portion of the metal oxides are replaced by metal halides, provided that the atomic ratio of the total halide content to the total halide content plus oxygen content of the glass is not over 1:5.

27. A glass in accordance with claim 23, wherein said fluorescing ion is present as an oxide of a fluorescing ion in the lanthanide series.

28. A glass in accordance with claim 27, wherein the oxide of a fluorescing ion in the lanthanide series is erbium oxide or thulium oxide.

29. A glass in accordance with claim 23, wherein said fluorescing ion is an erbium ion or thulium ion, wherein the erbium ion or thulium ion is present as an erbium oxide or a thulium oxide, and wherein said glass comprises 0.005–10% of the erbium oxide or thulium oxide.

30. An optical component for a telecommunication system comprising a glass composition according to claim 23.

31. A glass consisting essentially of:
65–97% $TeO_2$;
at least one first additional oxide of an element that has a valence greater than two and that is selected from the group consisting of Ta, Nb, Ti, Zr, Hf, Y, Gd, Lu, and Sc;
optionally one or more additional oxides selected from the oxides of Bi, W, La, Li, Na, K, Rb, Cs, Tl, Ca, Ba, Sr, Mg, Zn, Cd, Pb, Sb, H, B, P, Al, and Ga; and
at least one fluorescing ion.

32. A glass in accordance with claim 31, wherein said at least one first additional oxide an oxide of Ta or Nb.

33. A glass in accordance with claim 31, wherein said one or more second additional oxides are selected from the oxides of W, La, Li, Na, K, Rb, Cs, Tl, Ca, Ba, Sr, Mg, Zn, Cd, Pb, Sb, H, B, F, Al, and Ga.

34. A glass in accordance with claim 31, wherein a portion of the metal oxides are replaced by metal halides, provided that the atomic ratio of the total halide content to the total halide content plus oxygen content of the glass is not over 1:5.

35. A glass in accordance with claim 31, wherein said fluorescing ion is present as an oxide of a fluorescing ion in the lanthanide series.

36. A glass in accordance with claim 35, wherein the oxide of a fluorescing ion in the lanthanide series is erbium oxide or thulium oxide.

37. A glass in accordance with claim 31, wherein said fluorescing ion is an erbium ion or thulium ion, wherein the erbium ion or thulium ion is present as an erbium oxid or a thulium oxide, and wherein said glass comprises 0.005–10% of the erbium oxide or thulium oxide.

38. An optical component for a telecommunication system comprising a glass composition according to claim 31.

39. A glass consisting essentially of:
   65–97% $TeO_2$;
   at least one oxide of an element that has a valence greater than two wherein the element is W; and
   at least one fluorescing ion;
   wherein the glass further contains an oxide of Al.

40. A glass in accordance with claim 39, wherein said glass further contains one or more additional oxides selected from the oxides of Ta, Nb, Ti, La, Zr, Hf, Y, Gd, Lu, Sc, Bi, Li, Na, K, Rb, Cs, Tl, Ca, Ba, Sr, Mg, Zn, Cd, Pb, Sb, H, B, P. and Ga.

41. A glass in accordance with claim 39, wherein a portion of the metal oxides are replaced by metal halides, provided that the atomic ratio of the total halide content to the total halide content plus oxygen content of the glass is not over 1:5.

42. An optical component for a telecommunication system comprising a glass composition according to claim 39.

43. A glass consisting essentially of:
   65–97% $TeO_2$; and
   at least one oxide of an element that has a valence greater than two wherein the element is W; and
   at least one fluorescing ion;
   wherein the glass further contains an oxide of Ga.

44. A glass in accordance with claim 43, wherein said glass further contains one or more additional oxides selected from the oxides of Ta, Nb, Ti, La, Zr, Hf, Y, Gd, Lu, Sc, Bi, Li, Na, K, Rb, Cs, Tl, Ca, Ba, Sr, Mg, Zn, Cd, Pb, Sb, H, B, P, and Al.

45. A glass consisting essentially of:
   65–97% $TeO_2$; and
   at least one oxide of an element that has a valence greater than two wherein the element is W; and
   at least one fluorescing ion present as an oxide of a fluorescing ion in the lanthanide series;
   wherein the oxide of a fluorescing ion in the lanthanide series is erbium oxide or thulium oxide.

46. A glass consisting essentially of:
   65–97% $TeO_2$; and
   at least one oxide of an element that has a valence greater than two wherein the element is W; and
   at least one fluorescing ion;
   wherein said fluorescing ion is an erbium ion or thulium ion, wherein the erbium ion or thulium ion is present as an erbium oxide or thulium oxide, and wherein said glass comprises 0.005–10% of the erbium oxide or thulium oxide.

47. A glass consisting essentially of:
   65–97% $TeO_2$;
   at least one oxide of an element that has a valence greater than two wherein the element is La; and
   at least one fluorescing ion;
   wherein the glass further contains an oxide of Al.

48. A glass in accordance with claim 47, wherein said glass further contains one or more additional oxides selected from the oxides of Ta, Nb, Ti, W, Zr, Hf, Y, Gd, Lu, Sc, Bi, Li, Na, K, Rb, Cs, Tl, Ca, Ba, Sr, Mg, Zn, Cd, Pb, Sb, H, B, P, and Ga.

49. An optical component for a telecommunication system comprising a glass composition according to claim 47.

50. A glass consisting essentially of:
   65–97% $TeO_2$;
   at least one oxide of an element that has a valence greater than two wherein the element is La;
   at least one fluorescing ion; and
   wherein the glass further contains an oxide of Ga.

51. A glass in accordance with claim 50, wherein said glass further contains one or more additional oxides selected from the oxides of Ta, Nb, Ti, W, Zr, Hf, Y, Gd, Lu, Sc, Bi, Li, Na, K, Rb, Cs, Tl, Ca, Ba, Sr, Mg, Zn, Cd, Pb, Sb, H, B, P, and Al.

52. A glass consisting essentially of:
   65–97% $TeO_2$;
   at least one oxide of an element that has a valence greater than two wherein the element is La; and
   at least one fluorescing ion;
   wherein a portion of the metal oxides are replaced by metal halides, provided that the atomic ratio of the total halide content to the total halide content plus oxygen content of the glass is not over 1:5.

53. A glass consisting essentially of:
   65–97% $TeO_2$;
   at least one oxide of an element that has a valence greater than two wherein the element is La; and
   at least one fluorescing ion,
   at least one fluorescing ion present as an oxide of a fluorescing ion in the lanthanide series;
   wherein the oxide of a fluorescing ion in the lanthanide series is erbium oxide or thulium oxide.

54. A glass consisting essentially of:
   65–97% $TeO_2$; and
   at least one oxide of an element that has a valence greater than two wherein the element is LA; and
   at least one fluorescing ion;
   wherein said fluorescing ion is an erbium ion or thulium ion, wherein the erbium ion or thulium ion is present as an erbium oxide or thulium oxide, and wherein said glass comprises 0.005–10% of the erbium oxide or thulium oxide.

* * * * *